United States Patent
Esbensen

(10) Patent No.: US 11,808,249 B2
(45) Date of Patent: Nov. 7, 2023

(54) REACTION TO AN OVERSPEED EVENT

(71) Applicant: Siemens Gamesa Renewable Energy A/S, Brande (DK)

(72) Inventor: Thomas Esbensen, Herning (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 2 days.

(21) Appl. No.: 17/275,215

(22) PCT Filed: Aug. 23, 2019

(86) PCT No.: PCT/EP2019/072572
§ 371 (c)(1),
(2) Date: Mar. 11, 2021

(87) PCT Pub. No.: WO2020/057896
PCT Pub. Date: Mar. 26, 2020

(65) Prior Publication Data
US 2022/0049681 A1    Feb. 17, 2022

(30) Foreign Application Priority Data
Sep. 17, 2018 (EP) ..................... 18194816

(51) Int. Cl.
*F03D 7/04* (2006.01)
*F03D 7/02* (2006.01)

(52) U.S. Cl.
CPC ............. *F03D 7/045* (2013.01); *F03D 7/028* (2013.01); *F03D 7/0224* (2013.01);
(Continued)

(58) Field of Classification Search
CPC ...... F03D 7/045; F03D 7/0224; F03D 7/0264; F03D 7/0276; F03D 7/028;
(Continued)

(56) References Cited

U.S. PATENT DOCUMENTS

| | | | | |
|---|---|---|---|---|
| 10,683,844 | B2* | 6/2020 | Hammerum | F03D 7/0292 |
| 2009/0295161 | A1* | 12/2009 | Steiner | F03D 7/042 290/44 |
| 2017/0248124 | A1 | 8/2017 | Hammerum et al. | |

FOREIGN PATENT DOCUMENTS

| | | | | |
|---|---|---|---|---|
| WO | WO-2012136277 A1 * | 10/2012 | | F03D 7/043 |
| WO | 2014202079 A1 | 12/2014 | | |

OTHER PUBLICATIONS

Arne Koerber et al: "Combined Feedback Feed forward Control of Wind Turbines Using State-Constrained Model Predictive Control", IEEE Transactions on Control Systems Technology, IEEE Service Center, New York, NY, US, vol. 21, No. 4, Jul. 1, 2013 (Jul. 1, 2013), pp. 1117-1128' XP011515138, ISSN: 1063-6536, DOI: 10.1109/TCST.2013.2260749 the whole document.
(Continued)

*Primary Examiner* — Charles Reid, Jr.
(74) *Attorney, Agent, or Firm* — Schmeiser, Olsen & Watts LLP

(57) ABSTRACT

Provided is a method of controlling at least one wind turbine in case of a rotational overspeed situation, the method including: determining a current state related to the wind turbine; providing data related to the current state as input to a turbine model; predicting a load of at least one wind turbine component and power output of the wind turbine using the turbine model provided with the input for plural control strategies; comparing the predicted load and power output for the plural control strategies; and selecting that control strategy among the plural control strategies that satisfies a target criterion including the load and the power output.

13 Claims, 1 Drawing Sheet

Figure 1:
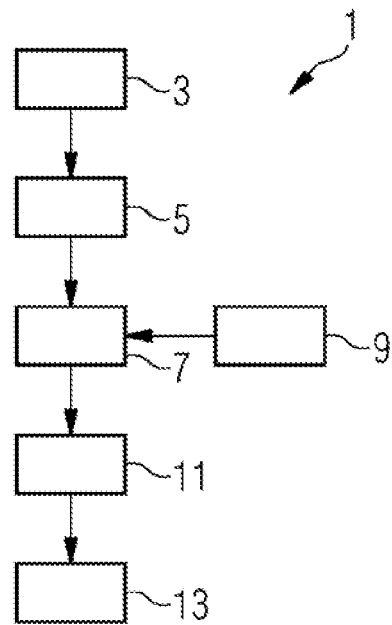

(52) U.S. Cl.
CPC ......... *F03D 7/0264* (2013.01); *F03D 7/0276* (2013.01); *F05B 2260/821* (2013.01); *F05B 2270/1011* (2013.01); *F05B 2270/1032* (2013.01); *F05B 2270/1033* (2013.01); *F05B 2270/327* (2013.01); *F05B 2270/328* (2013.01); *F05B 2270/331* (2013.01); *F05B 2270/335* (2013.01); *F05B 2270/404* (2013.01); *F05B 2270/8042* (2013.01)

(58) Field of Classification Search
CPC ........ F05B 2260/821; F05B 2270/1011; F05B 2270/1032; F05B 2270/1033; F05B 2270/327; F05B 2270/328; F05B 2270/331; F05B 2270/335; F05B 2270/404; F05B 2270/8042; F05B 2260/84
USPC ...................................... 290/44, 55
See application file for complete search history.

(56) References Cited

OTHER PUBLICATIONS

International Search Report and Written Opinion for PCT/EP2019/072572 dated Nov. 22, 2019.

\* cited by examiner

REACTION TO AN OVERSPEED EVENT

CROSS-REFERENCE TO RELATED APPLICATIONS

This application claims priority to PCT Application No. PCT/EP2019/072572, having a filing date of Aug. 23, 2019, which is based on EP Application No. 18194816.7, having a filing date of Sep. 17, 2018, the entire contents both of which are hereby incorporated by reference.

FIELD OF TECHNOLOGY

The following relates to a method and to an arrangement of controlling at least one wind turbine in case of a rotational overspeed situation and further relates to a wind turbine including the arrangement.

BACKGROUND

Conventionally, a wind turbine may be attributed a nominal rotational speed of the rotor of the wind turbine at which plural rotor blades are connected. Furthermore, a rotational speed limit, such as a controller overspeed limit, may be attributed to the wind turbine. Conventionally, a wind turbine is shutdown in case that the controller overspeed limit is exceeded. Thereby, shutting down the wind turbine may include to pitch the blade outward towards stop. Furthermore, power may be ramped down to zero and the converter may be disconnected. Thereby, operation of the wind turbine to produce electric energy is terminated. Conventionally, shutting down the wind turbine is considered to be a safe strategy.

Conventionally, overspeed monitoring prevents the wind turbine from reaching a critical speed that would cause increased fatigue or extreme loads and protects the turbine by shutting down the wind turbine. In particular, if a "controller overspeed limit" is exceeded, the turbine controller conventionally shuts down the wind turbine. This may be considered as a "soft limit". Furthermore, if a "safety overspeed limit" is further exceeded, the conventional safety system may shut down the wind turbine. The "safety overspeed limit" may be considered as a "hard limit" being higher than the "controller overspeed limit".

However, shutting down the wind turbine may be associated with negative effects as well:
- It may cause higher loading than actually continuing the operation. For example, fatigue cycles may be introduced by the significant change in operation point (for example from high bending to low bending of a tower or rotor blade)
- Ramping down the power may remove the counter-torque that otherwise may help to slow down the rotor
- Discontinued operation means a lowered availability and lower overall power output or lower AEP.

Thus, there may be a need for a method and an arrangement of controlling at least one wind turbine in case of a rotational overspeed situation, wherein disadvantages observed for the related art are at least reduced. In particular, there may be a need for a method and arrangement of controlling at least one wind turbine in case of a rotational overspeed situation, wherein loads on wind turbine components may be reduced and/or power output may be increased compared to conventional methods and arrangements.

SUMMARY

Embodiments of the present invention provide an optimized strategy for high rotational speed events. Thereby, an inventive idea may be to evaluate and select between different strategies when high speed events are observed. This may enable that the right decision is made without being a slave or assumptions that should try to consider all kinds of events and operating points.

According to an embodiment of the present invention it is provided a method of controlling at least one wind turbine in case of a rotational overspeed situation, the method comprising: determining a current (e.g. operational and/or environmental) state related to the wind turbine; providing data related to the current state as input to a turbine model; predicting (and/or estimating) a load of at least one wind turbine component and power output of the wind turbine using the turbine model provided with the input for plural (predetermined) control strategies (taken in case of overspeed); comparing the predicted load and power output for the plural control strategies; and selecting that control strategy among the plural control strategies that satisfies a target criterion comprising the load and the power output.

The method may be performed by a wind turbine controller and/or a park controller controlling plural wind turbines of a wind park. The current state may be determined by measuring and/or estimating and/or predicting for example operational parameters of the operation of the wind turbine and/or environmental parameters relating for example to wind and/or air properties. Thereby, for example measurement sensors may be utilized. The state may be defined by the state related data which are then provided and/or supplied to the turbine model as input, in particular to initialize the turbine model. The current state may for example be characterized by a vector of values of operational parameters and/or environmental parameters. Thus, the state may for example be characterized or described by a multi-dimensional state vector.

The turbine model may be implemented for example in hardware (e.g., ASIC) and/or software and may be capable of modelling (e.g., predicting) a time evolution of the dynamics of the wind turbine including dynamics of the rotor, the dynamics of the wind turbine blades, the electrical properties of the generator and so on. The turbine may, in comparison to conventionally known turbine models, be simplified such that it is enabled to predict online, i.e., in a fast manner, the load and the power output of the wind turbine.

The turbine model may comprise a high order model, for example comprising differential equations for a number of frequency components of electrical and/or mechanical quantities, such as oscillations, rotational speed, deflection or electrical properties such as voltage and/or current. The turbine model may further be known as a "Digital Twin", e.g., digital replica of physical processes and systems that can be used for simulation. Each wind turbine component may be modelled regarding its mechanical and/or electrical behavior.

Predicting (and/or estimating) the load of at least one wind turbine component and power output of the wind turbine using the turbine model for the plural (predetermined) control strategies may require assumptions and/or measured and/or preview and/or forecast information on environmental conditions.

The load of the at least one wind turbine component (in particular plural wind turbine components) may comprise a mechanical load and/or an electrical load. For example, a wind turbine blade may be deflected causing a load to the wind turbine blade. The wind turbine generator may for example be subjected to high current including an electric load to the generator which may cause for example heating of stator windings of the generator. The wind turbine tower may be bent during operation of the wind turbine in case of a rotational overspeed situation which also represents a load to the wind turbine tower. Furthermore, one or more mechanical components of the wind turbine may oscillate at a number of frequencies also representing respective mechanical loads to these components.

The control strategies may have been previously defined including e.g., setting values of plural operational reference values of operational parameters of the wind turbines. Thus, each of the control strategies may comprise a number of reference values to be adjusted for different operational parameters of the wind turbine, including for example a rotor pitch angle, rotational speed, power output, active power output, reactive power output, yawing angle and so forth. The control strategies may also each include a time course of actions to be taken, for example a time course of reference values of a number of operational parameters to be set. All control strategies may be in general suitable for reacting to a rotational overspeed situation. However, the control strategies may differ in the effects on the wind turbine, in particular regarding the loads on the components and/or power output of the wind turbine. Depending on the particular current state, one or the other of the plural control strategies may be beneficial for achieving the target criterion, for example ensuring that the loads on the wind turbine components are within allowed predetermined ranges and/or that the power output of the wind turbine is maintained at a residual level at least. Therefore, the load (on one or more wind turbine components) and the power output of the wind turbine is predicted for each of the plural control strategies using the wind turbine model. Thereby, the evolvement of the mechanical and/or electrical load and/or power related parameters over time may be determined over a particular predetermined time interval. At least for this predetermined time interval, for example 10 s, for example between 1 s and 100 s, between for example 1 s and 10 min, may be taken into account by the method.

All considered control strategies may be aimed and suitable for reducing the rotational speed to be within allowed limits. In particular, after loads of plural wind turbine components have been predicted, the predicted loads may be suitably combined, for example a weighted sum may be formed, weighting more essential wind turbine components higher than other less essential wind turbine components. If one or more of the predicted loads of the different wind turbine components is out of an allowed range, the considered control strategies may be discarded.

The predicted load or the predicted loads may be suitably combined with the power output to define for example a target function that may be optimized during performing the method. In particular, the target criterion may be represented by a target function comprising the load, in particular of all wind turbine components considered, and the power output of the wind turbine. The power output may relate to the electrical power output as output by for example the generator or a converter coupled to the generator. The power output may in particular relate to active power output.

Embodiments of the present invention may provide an online what-if-analysis that may optimize operation of the wind turbine. Conventionally, a current controller always shuts down the wind turbine if a speed threshold is exceeded. Embodiments of the present invention may be superior to the conventional approach which may be likely to be conservative in many cases. According to embodiments of the present invention, always the best control strategy is selected in case of high-speed events and also then utilized for controlling the wind turbine. Embodiments of the present invention may employ a wind turbine model and may hereby get rid of conservatism, and may increase the availability by not shutting down the wind turbine if not necessary.

According to an embodiment of the present invention, the target criterion includes at least one of: the predicted load of all wind turbine components is in an allowed range; and/or the predicted power output is maximized (in particular maximal among the different operation options or candidates or strategies, not maximal in the sense of nominal power) wherein the target criterion is in particular configurable.

The target criterion may in particular include that the predicted load of all wind turbine components is in an allowed range and that simultaneously the predicted power output is maximized. The target criterion may be adapted according to the particular application, in particular according to the configuration and design of the wind turbine and regulations. Thereby, a large flexibility may be provided.

According to an embodiment of the present invention, overspeed situation is identified if rotational speed of the main rotor of the wind turbine exceeds a first predefined rotational speed limit but is lower than a second predetermined rotational speed limit.

The first predefined rotational speed limit may correspond or may be equal to a conventionally used "controller overspeed limit". Different from conventional methods, however, the wind turbine is not necessarily shut down if the first predefined rotational speed limit is exceeded. Thus, in particular, one of the plural control strategies may be different from shutting down the wind turbine. Thereby, power output may be improved. The first predefined rotational speed limit may for example be in a range of 110% to 130% of a nominal rotational speed. Other values may be possible.

According to an embodiment of the present invention, if the rotational speed exceeds the second predefined rotational speed limit the wind turbine is shut down. The second predefined rotational speed limit may be higher than the first predefined rotational speed limit. If the rotational speed exceeds the second predefined rotational speed limit, no other control strategy other than shutting down the wind turbine may be available for controlling the wind turbine without damaging components of the wind turbine. The second predefined rotational speed limit may correspond or be equal to a "safety overspeed limit" conventionally used.

The first predefined rotational speed limit may for example be in a range of 130% to 200% of a nominal rotational speed. Other values may be possible.

According to an embodiment of the present invention, predicting the load and power output includes modelling the behavior of the wind turbine using the turbine model provided with the input for each of the plural control strategies for a predetermined time interval.

When the behavior of the wind turbine is modelled across a predetermined time interval (in particular after having determined the presence of an overspeed event), the load the wind turbine components will be subjected to after controlling the wind turbine according to a particular control strategy may be assessed comprising a more thorough picture of the time evolution of the load. Thereby, load prediction and also power output prediction may be improved. The predetermined time interval may be chosen based on the particular application, in particular may be in a range between 1 s and 60 s, or even longer 10 min for example.

Environmental conditions need to have some assumptions in how the situation will evolve. E.g. it may be assumed that wind speed, likely overlayed by an assumed or estimated turbulence, stays the same as when the first threshold is triggered, or follows a trend that may be observed.

For a better prediction, either information from other turbines (ahead relative to the wind speed) and/or lidar/radar data may be used for providing outlook or forecast information, which may be used to improve the prediction.

According to an embodiment of the present invention, the model models each rotor blade as one single component. Thus, the wind turbine model may be simplified compared to conventionally used models which may model for example each rotor blade as plural components. If the model is simplified in this manner, the calculation time may be reduced, enabling to run the method online, i.e., during operation of the wind turbine.

According to an embodiment of the present invention, the state comprises at least one measured and/or estimated operational parameter relating to an operation of the wind turbine, in particular including at least one of: a measured load of at least one blade; a rotational speed; a power output; a temperature of a wind turbine component; a pitch position of at least one blade, wherein the state comprises at least one measured and/or estimated environmental parameter relating an environmental condition of the wind turbine, in particular including at least one of: a wind speed; a wind direction; a thrust; an air density; an air humidity; an air temperature.

The load of at least one wind turbine blade may for example be measured by a sensor, such as a strain sensor installed at a root of the blade. Thereby, for example, deflection of the blade or deformation of the blade may be measured or determined. The current state may be needed to initialize dynamics variables of the wind turbine model. When all these or at least some of the operational parameters and the environmental parameters are taken into account, the evolution of the movement and behavior of the wind turbine may more thoroughly and accurately be predicted by using the wind turbine model.

According to an embodiment this information may be combined with assumptions (or knowledge from preview data sources as lidars) about the environmental conditions. The wind is the driving input to the wind turbine, so an important quantity, and the initial information from e.g., wind (and may be derivative of wind speed taken over last samples) as well as other quantities like air density, shear, and temperature may be valuable for giving a better prediction.

When pitching the rotor blades has a high impact to aerodynamic torque, the rotor blades can be pitched effectively thereby reducing rotational speed and without shutting down the wind turbine, while avoiding a situation of critical overspeed.

According to an embodiment of the present invention, at least one is assumed during the predetermined time interval: at least one environmental parameter is constant; at least one environmental parameter is extrapolated according to a forecast, and/or wherein an evolution of at least one operational parameter is predicted using the wind turbine model based on the current state and/or a change of current state, wherein in particular predictions are made based on adding uncertainty of current state values going ahead in time.

When an assumption is made (and/or information is available from one or more sources including forecast) on one or more of the operational and/or environmental parameters, the prediction may be accurately be performed.

According to an embodiment of the present invention, the plural control strategies include at least one of: shutting down the wind turbine, in particular by pitching the blades out of the wind and/or ramping down or ramping off power output; curtailing the rotational speed of the wind turbine rotor and/or the power output, in particular maintaining residual power output; continuing according to a normal operation, as before the overspeed situation occurred, wherein curtailing the rotational speed of the wind turbine rotor and/or the power output in particular includes: adjusting at least one blade pitch angle; adjusting a generator torque.

Shutting down the wind turbine may include performing several control settings, such as adjusting the pitch angles and/or adjusting converter settings and/or generator settings. Also curtailing the rotational speed of the wind turbine rotor and/or the power output may comprise several control actions taken in combination or subsequently. This may also include to adjust at least one blade pitch angle to a setting where the conversion efficiency from wind energy to rotational speed energy is reduced. In particular, the generator torque may be increased for braking the rotor.

According to an embodiment of the present invention, the wind turbine component includes at least one of: a wind turbine tower; a wind turbine rotor blade; a wind turbine drive train; at least one bearing of a rotor blade and/or of a wind turbine drive train. Other wind turbine components may be considered as well.

According to an embodiment of the present invention, the turbine model is an online turbine model predicting and/or estimating the load and power output during performing the method. "Prediction" may involve determining values in the future, whereas the model itself may "estimate" some current values (in particular loads) that are not directly measured or measurable from other current (relating to the same time point or range) parameters. The model can though be initiated and environmental conditions, together with control action from a control strategy, be evaluated to predict future behavior, including loads and power.

The turbine model may in particular be implemented in hardware and/or software, in particular in a parallel implementation running the predictions for all of the plural control strategies in parallel (or sequential in take a decision afterwards). Performing the method online may enable to accurately consider the current state. Herein, the current state may be the only true information that is guaranteed, hence a starting point, whereas the prediction will then go ahead and likely be based on assumptions or forecast information.

In particular, essentially no discretization of the values of the operational parameters and/or environmental parameters may be necessary, thereby improving the accuracy of the predictions.

According to an embodiment of the present invention, the turbine model is an offline turbine model that has, for plural discrete states and for the different plural control strategies, loads and power outputs pre-calculated, the method comprising: discretizing the data related to the state and feeding the discretized data to the offline turbine model; retrieving the pre-calculated loads and power outputs based on the discretized data.

The plant model primarily concern the dynamics of the wind turbine, and may be coupled with the controller, and the controller may then act with different strategies.

The offline turbine model may include the modelling of the wind turbine in more detail than the online wind turbine model. The computational time of performing a prediction for a particular control strategy using the offline model may be much higher, such as 10 times as long as performing the prediction using the online model. However, the offline model may require a discretization step of discretizing the operational parameters and/or environmental parameters defining the current state.

According to an embodiment of the present invention, the method further comprises controlling the wind turbine according to the selected control strategy. Controlling the wind turbine may thus result in a behavior of the wind turbine such as to satisfy the target criterion.

It should be understood that features, individually or in any combination, explained, described or provided for a method of controlling at least one wind turbine in case of a rotational overspeed situation, also apply, individual or in any combination, to an arrangement for controlling at least one wind turbine in case of a rotational overspeed situation according to embodiments of the present invention and vice versa.

According to an embodiment of the present invention it is provided an arrangement for controlling at least one wind turbine in case of a rotational overspeed situation, the arrangement comprising: a determining portion adapted to determine a current state related to the wind turbine; a turbine model connected to receive data related to the current state as input, wherein the model is adapted to, provided with the input, predict a load of at least one wind turbine component and power output of the wind turbine for plural predetermined control strategies; and a processor adapted to compare the load and the power output for the plural control strategies and select that control strategy among the plural control strategies that satisfies a target criterion comprising the load and the power output.

Furthermore, a wind turbine including the arrangement is provided according to an embodiment of the present invention.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the embodiments of invention is not limited.

BRIEF DESCRIPTION

Figure 2:
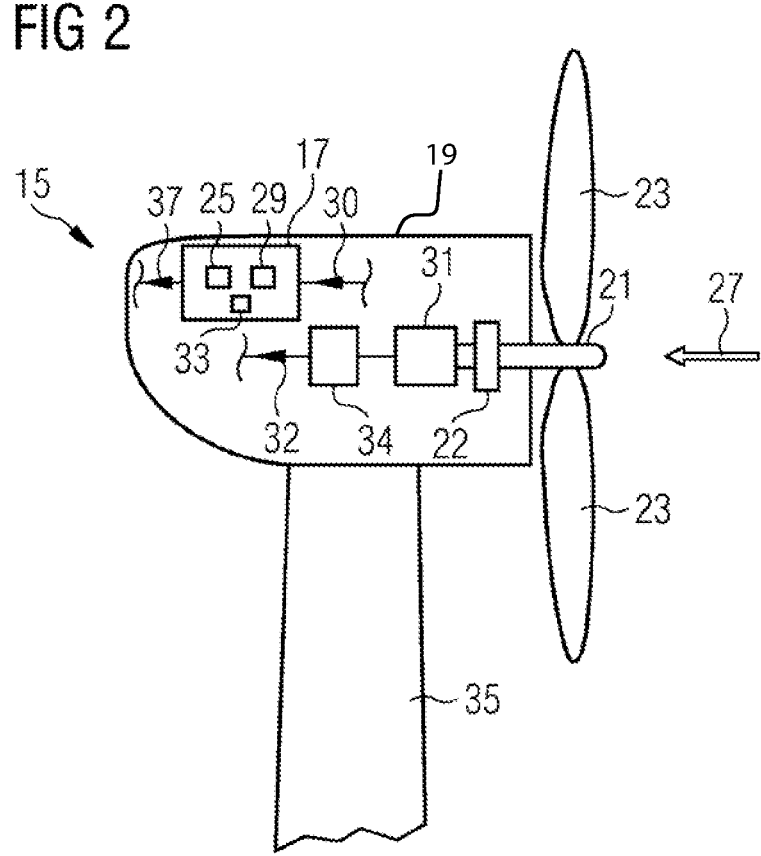

Some of the embodiments will be described in detail, with references to the following Figures, wherein like designations denote like members, wherein:

FIG. 1 schematically illustrates a method diagram of a method of controlling at least one wind turbine in case of a rotational overspeed situation according to an embodiment of the present invention; and FIG. 2 schematically illustrates a wind turbine including an arrangement for controlling at least one wind turbine in case of a rotational overspeed situation according to an embodiment of the present invention.

DETAILED DESCRIPTION

The method 1 of controlling at least one wind turbine in case of a rotational overspeed situation includes a step 3 of determining a current state related to the wind turbine. The method 1 further comprises a step 5 of providing data related to the current state as input to a turbine model. Using the turbine model in a step 7, a load of at least one wind turbine component and power output of the wind turbine is determined using the turbine model provided with the input for plural control strategies 9. In a method step 11, the predicted load and power output for the plural control strategies are compared. In a last method step 13 that control strategy among the plural control strategies that satisfies a target criterion comprising the load and the power output is selected for control of the wind turbine.

FIG. 2 schematically illustrates a wind turbine 15 including an arrangement 17 for controlling at least one wind turbine in case of a rotational overspeed situation according to an embodiment of the present invention which is configured to carry out the method 1 illustrated schematically in FIG. 1. The arrangement 17 is located in the nacelle 19 of the wind turbine, wherein the nacelle 19 further comprises a converter 34 and a generator 31 and coupled to the rotor shaft 21 at which plural rotor blades 23 are connected.

The method illustrated in FIG. 1 which is also carried out by the arrangement 17 is performed in case of an overspeed event of the rotor shaft 21. Therefore, the arrangement 17 comprises a determining section 25 which is adapted to determine, a current state related to the wind turbine 15. Thereby, the determining section 25 may also measure for example the speed and/or the direction of the wind 27 and other measurement values 30 related to the operation of the wind turbine 15. The arrangement 17 further comprises a turbine model 29 which is connected to receive data related to the current state as input. The model 29 is adapted to, provided with the input, predict a load of at least one wind turbine component (for example the wind turbine blade 23 and/or a load on a main rotor bearing 22 or a load of a generator 31 and/or a converter 34) and is also adapted to predict the power output 32 of the generator 31 for plural predetermined control strategies. The arrangement 17 further comprises a processor 33 adapted to compare the load and the power output for the plural control strategy and select that control strategy among the plural control strategies that satisfies a target criterion comprising the load and the power output. The load may for example also relate to the load of the wind turbine tower 35 on top of which the nacelle 19 is mounted. The arrangement 17 is adapted to output control signals 37 for controlling different components of the wind turbines, for example the pitch angle of the rotor blades, the generator torque, the converter and so on.

According to an embodiment of the present invention, in advance multiple strategies for high rotational speed events are designed. Among the multiple strategies may be:
1) shut down turbine by pitching out and ramping off power;
2) curtail wind turbine in speed (and/or power) but maintain a (beneficial) power output; and
3) continue (normal operation strategy as before event was identified).

When the rotational speed exceeds a predefined limit (for example a first predetermined rotational speed limit), then the following actions may be performed according to an embodiment of the present invention. The predefined speed limit could be similar to the conventional "controller overspeed limit" and may basically define a limit for when special care shall be taken, as one does not want much higher speeds that could for example exceed the "safety overspeed limit".

The following steps may be performed:
1) Initialize an online turbine model based on the current state
   States can be numerous candidates among: measured/ estimated wind speed, wind direction (estimated) thrust, (measured) blade loads, (measured) rotational speeds, (measured) power, (measured) pitch positions, (measured or estimated) environmental properties like air density, etc.

The turbine model may have dynamics for predicting relevant loads, relevant components can be for example: tower, blades and drive train.

2) Evaluate load channels running the initialized model with each of the multiple strategies for a preview window time assume values for the environmental conditions, for example:

assume that current estimated or measured properties are kept or make predictions based on trends (e.g., extrapolation) or make predictions based on adding uncertainty to current values going ahead in time (assume for example that wind picks up a bit)

3) compare load channels for the multiple strategies and select that strategy that gives safe loading with highest power output for example. Other criteria may be defined.

Furthermore, embodiments of the present invention may utilize preview information from for example an LIDAR, such as that assumed values for the environmental conditions can be replaced by preview/measurements.

Introduce multiple strategies for high rotational speed events but make the choice not from an online model-based what-if-analysis but from offline assessment that has given some indications on the scheduling parameters. Offline assessment then has to discretize operating points and states. This may be less computational heavy online that has higher complexity in configuration of the turbine controller since strategy shall be decided based on some hard coded schemes in some operational parameters. The offline solution may be an approximation because not all states and conditions may be considered accurately.

The "current state" mentioned above may include some past measured values as well as estimated parameter values (which may not be directly measurable).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method comprising:
   determining a rotational speed of a main rotor of a wind turbine;
   identifying a controller overspeed situation when the rotational speed of the main rotor of the wind turbine exceeds a first predefined rotational speed limit but is lower than a second predetermined rotational speed limit; and
   continuing to operate the wind turbine and controlling the wind turbine during the controller overspeed situation, wherein controlling includes:
   determining a current state related to the wind turbine;
   providing data related to the current state as input to a turbine model;
   predicting a load of at least one wind turbine component and power output of the wind turbine using the turbine model provided with the input for plural control strategies, wherein the plural control strategies include curtailing the rotational speed of the wind turbine rotor and/or the power output by adjusting at least one blade pitch angle and/or adjusting a generator torque;
   comparing the predicted load and power output for the plural control strategies; and
   selecting that control strategy among the plural control strategies that satisfies a target criterion comprising the load and the power output;
   further wherein when the rotational speed of the main rotor of the wind turbine exceeds the second predetermined rotational speed limit a safety overspeed situation is identified and the wind turbine is shut down.

2. The method according to claim 1, wherein the target criterion includes the predicted load of at least one or plural or all wind turbine components is in an allowed range; and/or the predicted power output is maximized wherein the target criterion is in particular configurable.

3. The method according to claim 1, wherein predicting the load and power output includes modelling the behavior of the wind turbine using the turbine model provided with the input for each of the plural control strategies for a predetermined time interval and/or wherein the turbine model models each rotor blade as one single component.

4. The method according to claim 1, wherein the state comprises at least one measured and/or estimated operational parameter relating to an operation of the wind turbine, including:
   a measured load of at least one blade;
   a rotational speed;
   a power output;
   a temperature of a wind turbine component; and/or
   a pitch position of at least one blade,
wherein the state comprises at least one measured and/or estimated environmental parameter relating an environmental condition of the wind turbine, including:
   a wind speed;
   a wind direction;
   a thrust;
   an air density;
   an air humidity; and/or
   an air temperature.

5. The method according to claim 1, wherein information from a lidar and/or a radar and/or at least one wind turbine upstream is acquired for determining evolvement and/or state of environmental condition.

6. The method according to claim 1, wherein at least one is assumed during the predetermined time interval:
   at least one environmental parameter is constant;
   at least one environmental parameter is extrapolated according to a forecast, and/or wherein an evolvement of at least one operational parameter is predicted using the wind turbine model based on the current state and/or a change of the current state.

7. The method according to claim 1, wherein the plural control strategies include
   maintaining residual power output.

8. The method according to claim 1, wherein the wind turbine component includes:
   a wind turbine tower;
   a wind turbine rotor blade;
   a wind turbine drive train; and/or at least one bearing of a rotor blade and/or of a wind turbine drive train.

9. The method according to claim 1, wherein the turbine model is an online turbine model predicting the load and power output during performing the method.

10. The method according to claim 1, wherein the turbine model is an offline turbine model that has, for plural discrete states and for the different plural control strategies, loads and power outputs pre-calculated, the method comprising:
   discretizing the data related to the state and feeding the discretized data to the offline turbine model; and
   retrieving the pre-calculated loads and power outputs based on the discretized data.

11. The method according to claim 1, further comprising:
   controlling the wind turbine according to the selected control strategy.

12. An arrangement for controlling at least one wind turbine, the arrangement comprising:
   a determining portion adapted to determine a current (operational) state related to the wind turbine;
   a turbine model connected to receive data related to the current (operational) state as input, wherein the model is adapted to, provided with the input, predict a load of at least one wind turbine component and power output of the wind turbine for plural predetermined control strategies; and
   a processor adapted to compare the load and the power output for the plural control strategies and select that control strategy among the plural control strategies that satisfies a target criterion comprising the load and the power output;
   wherein when a rotational speed of a main rotor of the at least one wind turbine exceeds a first predefined rotational speed limit but is lower than a second predetermined rotational speed limit a controller overspeed situation is identified and the selected control strategy includes continuing to operate the wind turbine but curtailing the rotational speed of the at least one wind turbine rotor and/or the power output by adjusting at least one blade pitch angle and/or adjusting a generator torque; and
   wherein when the rotational speed of the main rotor of the at least one wind turbine exceeds the second predetermined rotational speed limit a safety overspeed situation is identified and the selected control strategy includes shutting down the at least one wind turbine.

13. A wind turbine including the arrangement according to claim 12.

* * * * *